(12) United States Patent
De Ridder et al.

(10) Patent No.: US 11,384,008 B2
(45) Date of Patent: Jul. 12, 2022

(54) HEAT RESISTANT SEPARATION FABRIC

(71) Applicant: NV Bekaert SA, Zwevegem (BE)

(72) Inventors: Frank De Ridder, Hofstade-Aalst (BE); Alan Godbout, Bristol, CT (US)

(73) Assignee: NV BEKAERT SA, Zwevegem (BE)

( * ) Notice: Subject to any disclaimer, the term of this patent is extended or adjusted under 35 U.S.C. 154(b) by 64 days.

(21) Appl. No.: 16/928,161

(22) Filed: Jul. 14, 2020

(65) Prior Publication Data
US 2020/0339466 A1    Oct. 29, 2020

Related U.S. Application Data

(62) Division of application No. 15/580,045, filed as application No. PCT/EP2016/062843 on Jun. 7, 2016, now abandoned.

(30) Foreign Application Priority Data

Jun. 17, 2015  (EP) .................................... 15172456

(51) Int. Cl.
*C03B 40/00* (2006.01)
*D02G 3/44* (2006.01)
(Continued)

(52) U.S. Cl.
CPC ............. *C03B 40/005* (2013.01); *D02G 3/12* (2013.01); *D02G 3/185* (2013.01); *D02G 3/28* (2013.01); *D02G 3/38* (2013.01); *D02G 3/443* (2013.01); *D03D 15/267* (2021.01); *D03D 15/47* (2021.01); *D03D 15/513* (2021.01); *D04B 1/16* (2013.01); *D04B 21/12* (2013.01); *D10B 2101/06* (2013.01); *D10B 2101/20* (2013.01); *D10B 2401/04* (2013.01); *D10B 2505/00* (2013.01)

(58) Field of Classification Search
None
See application file for complete search history.

(56) References Cited

U.S. PATENT DOCUMENTS 277,564 A    5/1883  Good
2,050,298 A  8/1936  Everett
(Continued)

FOREIGN PATENT DOCUMENTS

EP    1 160 363    12/2001
EP    2 567 945    3/2013
(Continued)

OTHER PUBLICATIONS

Machine translation of JPH04202828 (Year: 1992).*
International Search Report dated Aug. 11, 2016 in International (PCT) Application No. PCT/EP2016/062843.

*Primary Examiner* — Shawn McKinnon
(74) *Attorney, Agent, or Firm* — Wenderoth, Lind & Ponack, L.L.P.

(57) ABSTRACT

The heat resistant separation fabric for use as tool cover in glass processing comprises heat resistant yarns (100). The heat resistant yarns comprise a core (110) and at least one wrap yarn (123, 125). The core is a core yarn. The core yarn is a multifilament glass yarn. The at least one wrap yarns (123, 125) comprises stainless steel fibers. The core yarn is present in the heat resistant yarn without crimp. The at least one wrap yarn is wrapped around the core yarn.

3 Claims, 1 Drawing Sheet

(51) Int. Cl.
*D02G 3/12* (2006.01)
*D02G 3/18* (2006.01)
*D04B 1/16* (2006.01)
*D02G 3/38* (2006.01)
*D02G 3/28* (2006.01)
*D03D 15/00* (2021.01)
*D04B 21/12* (2006.01)
*D03D 15/47* (2021.01)
*D03D 15/267* (2021.01)
*D03D 15/513* (2021.01)

(56) References Cited

U.S. PATENT DOCUMENTS

| | | |
|---|---|---|
| 2,458,243 A | 1/1949 | Biddle |
| 3,394,213 A | 7/1968 | Roberts et al. |
| 5,328,496 A | 7/1994 | Lesage et al. |
| 5,423,168 A | 6/1995 | Kolmes et al. |
| 6,279,305 B1 | 8/2001 | Hummel |

FOREIGN PATENT DOCUMENTS

| | | |
|---|---|---|
| FR | 2 621 906 | 4/1989 |
| FR | 2 838 455 | 10/2003 |
| JP | 4-202828 | 7/1992 |
| WO | 03/035563 | 5/2003 |
| WO | 2005/098105 | 10/2005 |
| WO | 2011/116992 | 9/2011 |
| WO | 2011/117048 | 9/2011 |
| WO | 2011/138131 | 11/2011 |

* cited by examiner

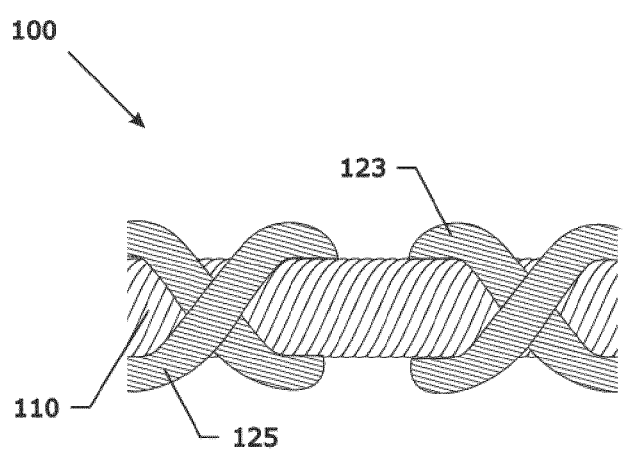

HEAT RESISTANT SEPARATION FABRIC

TECHNICAL FIELD

The invention relates to the field of heat resistant separations fabrics, e.g. used as tool cover in the production of glass. For instance as tool cover in the production of mirror glass or glass panels for windows in cars. For instance as covering of rings or annular molds used for quenching glass panels. For instance as covering of rollers used to transport glass panels.

BACKGROUND ART

Heat resistant separation fabrics are made out of yarns consisting out of fibers that have sufficient heat resistance properties. The use of stainless steel fibers for this purpose is well known. The use of hybrid yarns, which are yarns comprising more than one type of heat resistant fibers, has also been described in the field of heat resistant separation fabrics.

Knitted heat resistant separation fabrics comprising stainless steel fibers are known, e.g. from WO2011/116992. The document describes fabrics consisting out of stainless steel fiber yarns. The document also mentions the use of hybrid yarns.

FR2838455 discloses a heat resistant separation fabric comprising a hybrid yarn. The hybrid yarn has an outer sheath consisting out of 5-95 percent poly(p-phenylene-2,6-benzobisoxazole) fibers (PBO-fibers) and 5-95 percent high temperature resistant metal fibers. The hybrid yarn is produced by friction spinning, hollow spindle spinning or low torsion assembly twisting. The hybrid yarn optionally comprises a heat resistant core. The heat resistant core can be a glass yarn, a stainless steel yarn, a PBO yarn or a para-aramid yarn. The core yarn can be a multifilament yarn or a spun yarn. It is mentioned that the presence of the core yarn increases the strength of the hybrid yarn.

WO2005/098105—after providing an overview of patent publications describing heat resistant separation fabrics comprising more than one type of heat resistant fibers—discloses a heat resistant separation fabric comprising hybrid yarns comprising metal, mineral and carbon-rich fibers. The document discloses that in the case of using friction spinning (e.g. using DREF type yarn spinning) to manufacture the hybrid yarn, a heat resistant core yarn can be provided in the hybrid yarn. The document mentions carbon-rich yarns and mineral fiber yarns as core yarns. It is mentioned that the use of core yarns out of metal fibers or rich in metal fibers is not preferred, as it results in a yarn which is too rigid.

It is a problem of the yarns and fabrics disclosed in FR2838455 and WO2005/098105 that fibers are loosely bonded into the yarn surface. The result is hairiness on the yarn and fabric surface, and fibers getting loose and lost during use of the heat resistant separation fabric. Such hairiness and loose fibers have negative impacts on the quality of the glass that is produced. E.g. loose PBO fibers or PBO hairs oxidize faster. Because of the oxidation, the PBO fibers get hard and create markings in the glass surface.

The most difficult quality aspect in the production of bent mirrors is correct reflection of objects that appear in the bent mirror. Even small markings on the mirror have a negative impact on the reflection. Because of the reflection requirement, quality requirements for mirrors are of a different nature than for (automotive) window glass, and are higher, more demanding. EP2567945A2 discloses a woven fabric suited for covering a male mold for the bending of glass, e.g. mirror glass. The weave between the weft yarns and the warp yarns is a satin weave. The warp yarns and/or the weft yarns comprise stainless steel fibers of discontinuous length. In a preferred embodiment, the weft yarns are plied yarns that comprise as single yarn at least one glass yarn or ceramic yarn, and at least one yarn that comprises stainless steel fibers.

It is a problem of the heat resistant separation fabrics of the prior art that they do not provide optimal performance in terms of consistency of the quality of the glass product processed on different tools in parallel on the glass production line, in general, and particularly on mirror glass production lines.

U.S. Pat. No. 5,328,496A discloses an apparatus for bending/tempering glass sheets raised to their softening point. The apparatus includes an upper plate mold and a lower annular mold on which the glass sheets are deformed, and with respect to which the edge of glass sheets move as a result of their deformation, particularly by horizontal pressing between the upper bending mold and the lower mold. The bent sheets are thermally tempered in air on the same annular mold in a tempering station. This annular mold is designed in such a way that its contact surface with the glass sheets at the start of their deformation on the mold, being located on the outer periphery of the mold, is appropriate for the mark-free displacement of the glass on the mold and in particular for pressing, and so that at the end of displacement, and in particular at the end of pressing, the contact surface located on the inner periphery of the mold is appropriate for tempering. The annular mold can be covered by a knitted fabric out of stainless steel fibers. U.S. Pat. No. 5,328,496 refers to FR2621906 to indicate that for the annular mold cover a gauze texture fabric is preferred.

WO2011/138131A2 discloses a fabric adapted for covering at least partially a ring for quenching glass which has been bent. The fabric comprises at least three strips: a strip of a high-density knitted structure for quenching the glass and two strips of a lower density structure for attaching the fabric to the ring. The document discloses the preferred use of yarns comprising stainless steel fibers and PBO fibers.

Heat resistant separation fabrics are also used as cover of rollers used to transport hot glass panels. WO2011/117048 discloses a sleeve for covering a roller for conveying glass panels in a heating system. The sleeve is a fabric comprising yarns; the yarns comprise glass fibers or ceramic fibers; and metal fibers.

It is a problem that the fabrics of the prior art are not optimal in view of the increasing quality requirements of automotive glass products. For automotive mirrors and for front and back car windows, the optical (reflection) quality requirements are becoming more important. It needs to be mentioned that quality requirements for automotive glass products are steadily increasing. E.g. colored car windows are more and more used, minor markings on such colored car windows are more easily visible.

DISCLOSURE OF THE INVENTION

The first aspect of the invention is a heat resistant separation fabric for use as tool cover in glass processing. The fabric can e.g. be used as tool cover in mirror glass processing (e.g. automotive mirror glass processing), or as cover of rollers—e.g. bent rollers—or as cover of quench rings in automotive glass processing, or a tool cover in automotive glass processing. When in use as tool cover in glass processing, the heat resistant separation fabric separates the tool that is covered by the heat resistant separation fabric from the glass product being processed. Preferably, the fabric is suitable for continuous use at a temperature of more than 600° C.; more preferably, the fabric is suitable for continuous use at a temperature of more than 650° C. The heat resistant separation fabric comprises or consists out of heat resistant yarns. The heat resistant yarns comprise or consist out of a core and at least one wrap yarn. The core is a core yarn. The core yarn is present in the heat resistant yarn without crimp. The at least one wrap yarn is wrapped around the core. The core yarn is a multifilament glass yarn. The at least one wrap yarn comprises and preferably consists out of stainless steel fibers.

The inventive fabric surprisingly provides an excellent consistency at higher quality of glass products processed on different tools used in parallel on a glass production line. The effects that result in the surprising benefits are not well understood. It is believed however that the combination of the core yarn that is present in the heat resistant separation yarn without crimp, and the wrap yarns that are present in a well-defined constant position and in which the fibers do not get loose or show excessive hairiness, are essential to achieve the surprising beneficial result.

With the core yarn is present in the heat resistant yarn without crimp is meant that when a length L of the heat resistant yarn is disentangled, the length of the core yarn in this length L is equal to L. Preferably, with the core is present in the heat resistant yarn without crimp is meant that there is no crimp beyond production tolerances; more preferably, production tolerances of the crimp can be 1% of the length of the heat resistant yarn.

Preferably, the number of turns per meter with which the at least one wrap yarn is wrapped around the core yarn is at least 25 turns per meter length of the heat resistant yarn, preferably at least 250 turns per meter length of the heat resistant yarn, more preferably at least 400 turns per meter length of the heat resistant yarn.

Preferably, the heat resistant yarn comprises a first set of at least one wrap yarn. The wrap yarn or wrap yarns of the first set of at least one wrap yarn are wrapped in Z-direction around the core yarn. The heat resistant yarn comprises a second set of at least one wrap yarn. The wrap yarn or warp yarns of the second set of at least one wrap yarn are wrapped in S-direction around the core yarn.

Such embodiment synergistically adds to achieve the benefits of the invention. Preferably, the number of yarns in the first set of at least one wrap yarn is identical to the number of yarns in the second set of at least one wrap yarn; more preferably each of the first set of at least one wrap yarn and the second set of at least one wrap yarns consist out of one wrap yarn.

Preferably, the wrap yarn or wrap yarns of the first set of at least one wrap yarn and the wrap yarn or wrap yarns of the second set of at least one wrap yarns are wrapped around the core yarn with the same number of turns per meter of length of the heat resistant yarn.

In an exemplary embodiment, the heat resistant separation fabric is a woven fabric. Preferably, the same type of heat resistant yarn is used as warp yarn and as weft yarn of the woven fabric. Preferred woven fabrics have a satin weave or a panama weave or a twill weave. However, a satin weave is most preferred to achieve best quality results.

In an exemplary embodiment, the heat resistant separation fabric is a knitted fabric, preferably a weft knitted fabric. E.g. a tubular weft knitted fabric. In another exemplary embodiment, the heat resistant separation fabric is a warp knitted fabric, e.g. a warp knitted fabric with a mesh structure. E.g. a warp knitted tape fabric, preferably a warp knitted tape fabric with a mesh structure.

Preferably, the wrap yarns are twisted yarns, comprising or consisting out of fibers of discrete (=discontinuous) length.

Preferably, the twist in the wrap yarns is at least 110 turns per meter (tpm), more preferably at least 120 tpm.

In a preferred embodiment, the wrap yarn is a multiply yarn, preferably wherein the plies of the multiply yarn are yarns spun from fibers of discrete length. In a further preferred embodiment, the wrap yarn is a two-ply yarn, more preferably wherein each of the two plies are yarns spun from fibers of discrete length.

In preferred embodiments, the wrap yarn or wrap yarns is/are multifilament yarns, preferably twisted multifilament yarns, preferably with a twist less than 175 turns per meter; and preferably with a twist of more than 40 turns per meter. Preferred multifilament yarns have a yarn count higher than 110 tex. Preferred multifilament yarns have a yarn count less than 1010 tex. Examples of such multifilament yarns are stainless steel multifilament yarns.

In preferred embodiments, the wrap yarn or wrap yarns is/are plied yarns, e.g. a two-ply yarn, a three-ply yarn or a four-ply yarn. The plies can be spun yarns or multifilament yarns. It is also possible to combine spun yarn plies with multifilament yarn plies. An example of a multiply wrap yarn is a four-ply multifilament stainless steel yarn.

Preferably, the wrap yarn or wrap yarns is/are plied yarns, wherein the ply twist is at least 150 tpm (turns per meter), and preferably more than 175 tpm, even more preferably more than 200 tpm.

The second aspect of the invention is a heat resistant separation fabric as in any embodiment of the first aspect of the invention. The fabric is for use as tool cover in glass processing, e.g. in mirror glass processing, e.g. in automotive mirror glass; and preferably for use at temperatures higher than 600° C., more preferably for use at temperatures higher than 650° C. In the fabric of the second aspect of the invention, the core yarn is a multifilament glass yarn.

The application of woven heat resistant fabrics in mirror glass production has been described in EP2567945. The application of the inventive heat resistant fabric according to the second aspect of the invention as tool cover in the production of mirror glass has surprisingly shown to result in mirror glass of an excellent consistency of quality of mirror glass processed on different tools in parallel on a mirror glass production line. The effects that result in the surprising benefits are not well understood. It is believed however that the combination of the core yarn which is a multifilament glass yarn that is present in the heat resistant separation yarn without crimp, and the wrap yarns that are present in a well-defined constant position and in which the fibers do not get loose or show excessive hairiness, are essential to achieve the surprising beneficial effects.

Preferably, in the heat resistant separation fabric of the second aspect of the invention, the wrap yarns are spun yarns comprising or consisting out of stainless steel fibers of discrete length; preferably wherein the twist in the wrap yarns is at least 175 tpm, more preferably at least 250 tpm, more preferably at least 300 tpm and preferably below 375 tpm.

In preferred embodiments of the second aspect of the invention, the heat resistant fabric does not comprise organic polymer fibers. Such embodiments are favored for applications at temperatures higher than 600° C., and even higher than 650° C.

In the fabric of the second aspect of the invention, the multifilament glass yarn can e.g. be out of E-glass or out of S-glass. The multifilament glass yarn can be a single yarn or a plied yarn. Preferably, the diameter of the individual glass filaments is less than 15 μm, more preferably less than 10 μm.

Preferably the fabric according to the second aspect of the invention is a woven fabric. Preferably a woven fabric with the same yarns in weft and in warp direction. Preferably, the fabric is a woven fabric with a satin weave, a panama weave or a twill weave. Most preferred is a woven fabric with a satin weave.

Preferred woven fabrics have a weft density between 10 and 30 weft yarns per centimeter. Preferred woven fabrics have a warp density between 10 and 30 weft yarns per centimeter. Preferred woven fabrics have a specific weight between 600 and 800 g/m². Preferred woven fabrics have a thickness between 0.5 and 1.5 mm. Preferred woven fabrics have air permeability between 650 and 900 I/dm²/min when measured at an 100 Pa underpressure and according to ISO 9237:1995.

For use in the invention, stainless steel fibers, e.g. with a diameter less than 40 micrometers, e.g. less than 25 micrometers, can be obtained by a bundle drawing technique. This technique is disclosed e.g. in U.S. Pat. Nos. 2,050,298, 3,277,564 and in 3,394,213. Metal wires are forming the starting material and are covered with a coating such as iron or copper. A bundle of these covered wires is subsequently enveloped in a metal pipe. Thereafter the thus enveloped pipe is reduced in diameter via subsequent wire drawing steps to come to a composite bundle with a smaller diameter. The subsequent wire drawing steps may or may not be alternated with an appropriate heat treatment to allow further drawing. Inside the composite bundle the initial wires have been transformed into thin fibers which are embedded separately in the matrix of the covering material. Such a bundle preferably comprises no more than 2000 fibers, e.g. between 500 and 1500 fibers. Once the desired final diameter has been obtained the covering material can be removed e.g. by solution in an adequate pickling agent or solvent. The final result is the naked fiber bundle. The bundles of continuous length fibers can be transformed into fibers of discrete length by means of stretch breaking.

BRIEF DESCRIPTION OF FIGURES IN THE DRAWINGS

FIG. 1 shows an example of a heat resistant yarn that can be used in the invention.

MODE(S) FOR CARRYING OUT THE INVENTION

FIG. 1 shows an example of a heat resistant yarn 100 that can be used as yarn in fabrics according to the invention. The heat resistant yarn comprises a core 110. The core is a core yarn. The core yarn is a multifilament glass yarn. The core yarn is present in the heat resistant yarn without crimp. The heat resistant yarn comprises a first set of wrap yarns 123, wrapped in Z-direction around the core yarn. The heat resistant yarn comprises a second set of wrap yarns 125, wrapped in S-direction around the core yarn. The yarns of the first set of wrap yarns 123 and the yarns of the second set of wrap yarns 125 are wrapped around the core yarn with the same number of turns per meter. The wrap yarns comprise stainless steel fibers.

A first example of the invention is a woven fabric (fabric A) according to the second aspect of the invention. The fabric consists out of the same heat resistant yarns in weft and in warp direction of the woven fabric. The heat resistant yarn has a two-ply 33*2 tex (150 turns per meter ply twist in S-direction) multifilament glass (S-glass) yarn as core yarn. The core yarn is present in the heat resistant yarn without crimp. The core yarn is wrapped with two stainless steel fiber yarns. The wrapping twist of each of the two stainless steel fiber wrap yarns is 250 turns per meter. One of the stainless steel fiber yarns is wrapped in Z-direction; the other stainless steel fiber yarn is wrapped in S-direction. The stainless steel fiber wrap yarns are 11/2 Nm (=90*2 tex) spun and ply twisted stainless steel fibers yarns, consisting out of stretch broken stainless steel fibers of equivalent diameter 12 μm, out of alloy AISI 316L. The woven fabric has a weft density 18 weft yarns per centimetre and a warp density 18 warp yarns per centimetre. The weave was a satin 5 weave. The fabric has a specific weight of 700 g/m² and is 1 mm thick.

The inventive fabric (woven fabric A) has been compared as tool cover in mirror glass production with two other fabrics, woven fabrics B and C, similar in weave and construction as fabric A. Fabric B had 100% two-ply stainless steel fiber yarn in warp direction and ply-twisted fiberglass/stainless steel fiber yarn in weft direction. Fabric C had ply-twisted fiberglass/stainless steel fiber yarn in warp and in weft direction. With ply-twisted fiberglass/stainless steel fiber yarn is meant that a fiberglass yarn and a stainless steel fiber yarn are twisted together. Whereas fabric A resulted in consistent high quality mirror glass processed on the different tools in parallel on the production line; fabrics B and C showed much worse quality results. Fabric B showed a large variation in mirror glass quality between mirror glass processed on the different tools in parallel on the production line. Fabric C showed overall lower quality of the produced mirror glass, and more variation in quality than fabric A.

It has also been observed that in terms of consistent quality in mirror glass production, woven fabrics provide significantly better results than knitted fabric. Probably, this is related with the more "linear" position of the yarns in a woven fabric compared to in a knitted fabric.

The invention claimed is:
1. A method of processing a glass product;
wherein a tool is provided to process a glass product;
wherein the tool is covered by a heat resistant separation fabric;
wherein the heat resistant separation fabric comprises heat resistant yarns;
wherein the heat resistant yarns comprise
a core;
wherein the core is a core yarn,
wherein the core yarn is a multifilament glass yarn;
wherein the core yarn is present in the heat resistant yarn without crimp; and
at least one wrap yarn,
wherein the at least one wrap yarn comprises stainless steel fibers;
and wherein the at least one wrap yarn is wrapped around the core yarn;
wherein the heat resistant separation fabric is provided to separate the tool from the glass product being processed such that the glass product does not contact the tool directly.
2. The method as in claim 1, wherein the glass product is mirror glass.

3. The method as in claim 1, wherein the glass product is automotive glass.

\* \* \* \* \*